US005425614A

United States Patent [19]

Perussi et al.

[11] Patent Number: 5,425,614

[45] Date of Patent: Jun. 20, 1995

[54] BOTTLE LIFTING AND INVERTING APPARATUS

[76] Inventors: Rolando Perussi; Ruben Perussi, both of 10 Thomas, Irvine, Calif. 92718

[21] Appl. No.: 341,471

[22] Filed: Nov. 16, 1994

[51] Int. Cl.[6] .................................... B65G 65/24

[52] U.S. Cl. ........................ 414/422; 414/420; 414/767; 414/460; 141/351; 254/4 R; 294/31.2

[58] Field of Search ............... 141/351, 352, 356; 294/31.2; 414/620, 621, 422, 420, 424, 459, 460, 758, 766, 767; 254/4 R, 4 C

[56] References Cited

U.S. PATENT DOCUMENTS 3,868,033 2/1975 Le Duff .................... 414/420 X
4,306,707 12/1981 Roscoe, Jr. ............... 414/422 X
5,255,947 10/1993 Schwartz .................... 294/31.2
5,288,200 2/1994 Burgers et al. ............ 414/422 X
5,379,814 1/1995 Posly ........................ 414/422 X

FOREIGN PATENT DOCUMENTS 496716 8/1954 Italy .............................. 414/422
7811885 6/1980 Netherlands ..................... 414/422
1299963 3/1987 U.S.S.R. .......................... 414/422
1544621 2/1990 U.S.S.R. .......................... 414/422

*Primary Examiner*—Frank E. Werner
*Attorney, Agent, or Firm*—Macro-Search Corp.

[57] ABSTRACT

A water bottle installation apparatus with a vertical frame and support base designed to lift, transport and invert large water bottles. The apparatus includes a cranking device, and two pulleys arranged so that a line attached to the cranking means runs through a first pulley located on an extending arm at the top of the frame, down through a second pulley located on a yoke of the device, and back up to the extending arm, so that the yoke hangs freely from the extending arm. A girdle is provided to be secured around the water bottle and rotatably attached to the yoke, so that the yoke, the girdle and the bottle can be raised and lowered by the cranking device, and the girdle can rotate within the yoke so that the bottle is easily inverted into a water cooler.

7 Claims, 2 Drawing Sheets

BOTTLE LIFTING AND INVERTING APPARATUS

FIELD OF THE INVENTION

This invention relates generally to bottle lifting devices and more particularly to a device that aids in the transport, lifting and inverting of a cylindrical water bottle standardly used with water dispensing machines.

BACKGROUND OF THE INVENTION

There are many areas in the country where a fresh water supply is not readily available, has become contaminated, or is not satisfactorily purified before it is allowed into public use. Unfortunately, the number of areas faced with such problems is continually increasing. As a result, there has been a dramatic rise in the popularity and use of bottled water. Such water is readily available in small, portable bottles at local supermarkets and the like for convenient for drinking in the car, at the gym, or other distant locations. However, purchasing numerous small containers of water is neither an economical nor practical way to meet all the water needs of households or businesses.

To more efficiently meet such high water demands, water distributing companies deliver bulk quantities of purified water, typically distributed in five-gallon bottles. Water dispensing units, designed specifically to hold a five-gallon bottle of water, are often used in conjunction with the bottles so that the water is easily and immediately accessible upon demand. The dispensers are manufactured in a variety of configurations, but generally all are open at the top so as to accept the mouth of a five-gallon water bottle.

However, there are several obstacles that frequently inhibit the process of securing a full bottle in the dispenser. First of all, full five-gallon water bottles weigh more than 40 pounds. Since most water distributors drop off several full bottles at the door step periodically, a person must carry or drag all of the bottles to a storage area. As the water supply in the dispenser is depleted, each heavy bottle must be transported from the storage area to the dispenser. This task alone requires substantial strength. An even greater problem is that most water dispensers are either positioned on a countertop, or are designed with a substantial vertical height. While this allows water to be easily accessed from a standing position, it means a great deal of physical strain is required to raise the 40 pound bottle of water up to the height of the dispenser. But perhaps the greatest difficulty is trying to properly position the bottle on the dispenser. This process requires that the bottle be raised above the dispenser and quickly inverted and placed into the dispenser's top opening.

Obviously then, this entire process of transporting, lifting and inverting the bottles requires a great deal of dexterity and physical strength, and is completely impossible for many people, especially the elderly and those suffering from back problems. For those who are healthy, improperly lifting and transporting the full bottles can cause pulled muscles, strains and even permanent injury. Even those in prime condition often have difficulties with the inversion procedure, as it is somewhat awkward and, if not done quickly and properly, results in a great deal of water spills from the bottle. Thus, to successfully complete the process often requires at least two people, and even then the task is difficult.

There are numerous devices that can be used to facilitate the transport of the bottles to the storage area or dispenser, such as a dolly, a cart, a wagon, a skateboard, or any other type of device with wheels and a support base. However, these devices are only useful for transporting the bottles, and, as such, a great deal of effort is still required to lift the bottles onto the transporting device, raise them up to the height of the dispenser and invert them into the proper dispensing position.

Likewise, there are several types of hoisting apparatuses known to the public that could be used to raise the bottles up to the necessary height. Generally, hoists provide a mechanical advantage that significantly decreases the amount of work required to complete the task at hand. Thus, while such devices would decrease the work necessary to raise the bottle, they are of no use in the transport and inversion of the bottle.

U.S. Pat. No. 5,255,947, issued to Peter Schwartz (1993), discloses a device intended to aid in the process of inverting water bottles onto the dispenser. As disclosed, the device includes a pair of straps that encircle a large bottle, pass through a tightening element and a pair of adjusting elements, and are each secured at the ends to a handle. According to the reference, in operation, the straps encircle the bottle at a ridge near the neck, and the adjusting elements are positioned on either side of the bottle so that the handle can be lifted straight up from the bottle and engaged to carry the bottle upright. To invert the bottle, the straps are repositioned so that they encircle the bottle at the ridge near the bottom, and the adjusting elements are slid together on the same side. The bottle is lifted with one hand on the bottle's neck and the other on the device's handle, using the device as a pivot to invert the bottle.

Although the pivot feature in this device aids in the inversion process, it still requires that the user carry a significant portion of the bottle's weight. While the reference recommends grasping the handle and using the device to carry the bottle upright, this technique does not lessen the burden of transporting the bottle. In fact, to carry the 40 pound bottle in such a manner requires a tremendous amount of arm and hand strength, and is even more difficult and dangerous than simply using traditional carrying techniques. In addition, the Schwartz 's device provides no help in raising the bottle to the height of the dispenser.

Without a doubt then, there is a clear need for a single device that can greatly reduce the work involved in the transporting, lifting and inverting of large water bottles, thereby allowing people of all strength levels to enjoy the benefits of a purified water dispenser. The present invention fulfills these needs and provides further related advantages as described in the following summary.

SUMMARY OF THE INVENTION

The present invention is a device to aid in the transporting, lifting and inverting of a heavy water bottle. In essence, the device is composed of a vertically oriented main frame, between $5\frac{1}{2}$ to 6 feet tall, so as to sufficiently accommodate various sized water dispensers. The frame has two horizontal bars that extend forwardly and provide a base for the device, and a support arm positioned on each side of the frame at an angle between the frame and the horizontal base, thereby supporting and maintaining the frame in the vertical position. A wheel extends from each corner of the base so as to engage with the ground and allow the device to be easily transported.

The frame of the device also includes an arm that extends outwardly and a pulley attached to the outer portion of the arm. A spool and crank are positioned at one side of the frame, approximately waist-high, so that the crank is easily grasped.

A cord is secured around the spool, and then threaded up through the pulley on the arm, down through a pulley positioned on an inverted U-shaped yoke, and back up to the arm where the end of the cord is secured. As such, the cord dangles the inverted U-shaped yoke freely from the arm of the device. The inverted U-shaped yoke has C-shaped hooks at each end.

The device also includes a plastic girdle formed in a circular shape conforming to the circumference of the body of a water bottle with a height conforming to the space between the horizontal ridges commonly found on such water bottles. The covering includes a series of clamps that secure the girdle around the bottle. The opposing sides of the girdle each have a protruding knob. These knobs are designed to easily be pivotally engaged within the C-shaped hooks on the yoke, thereby securing the water bottle to the yoke.

As such, when it is desired to use the device, it is wheeled to the location of the bottle of water. The girdle is placed around the bottle and secured firmly in place, and the device is rolled into position around the bottle of water so that the inverted U-shaped yoke is above it and the horizontal base bars are positioned on either side. The C-hooks on each end of the yoke are secured around the protruding knobs on either side of the girdle around the bottle. The crank is then turned, raising the yoke and the bottle of water upward off the ground.

This line configuration provides a significant mechanical advantage, so that force needed to turn the crank is only approximately half that required to lift the bottle. Thus, it is an object of the present invention to provide a convenient means for easily lifting heavy bottles without requiring excessive strength.

Once the bottle is raised from the ground, the device is wheeled to the location of the dispenser. The crank is once again employed to raise the bottle to the height of the dispenser, and then a crank lock is used to keep the bottle raised to the selected height. The bottle is easily rotated into an inverted position above the dispenser, as the knobs on the covering can complete a full range of motion while being securely held within the C-hooks.

Thus it is an object of the invention to improve upon all other prior art by providing a single device that effectively assists in all steps involved in the proper positioning of a water bottle in a dispenser, namely transporting, lifting and inverting the bottle.

It is another object of the invention to provide a device with dimensions and features that are tailored specifically for the transporting of large water bottles.

It is another object of the invention to be conveniently compactable for storage. This is accomplished by attaching the support arms to the frame through a vertical slit, so that the support arms can slide down the length of the frame while the horizontal base pivots upward, until it is folded against the main frame so that the device utilizes less storage space.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
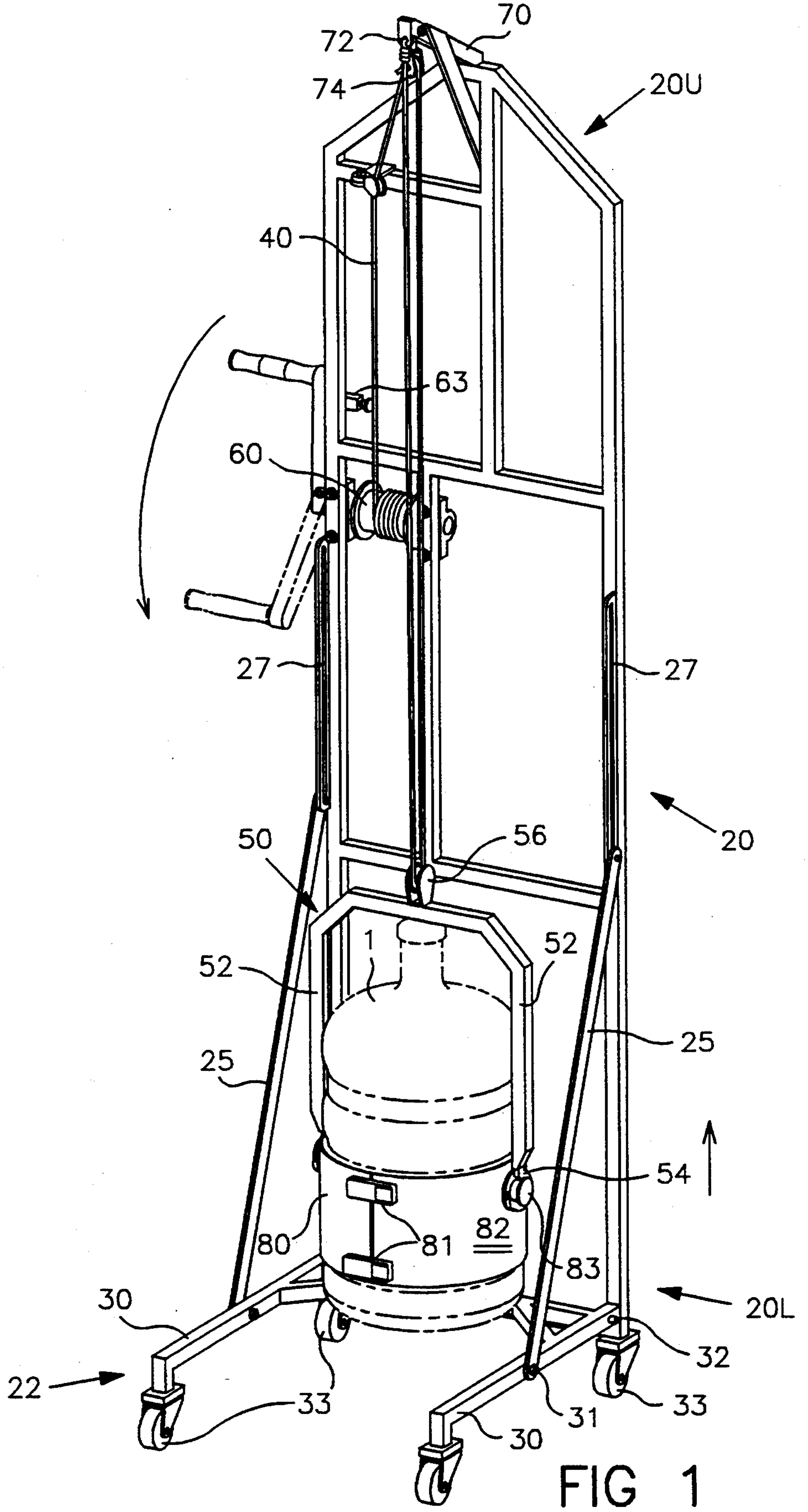
FIG. 1 is a perspective view of the invention, particularly showing a yoke of the invention secured to a bottle, moving upwardly from ground level.
Figure 2:
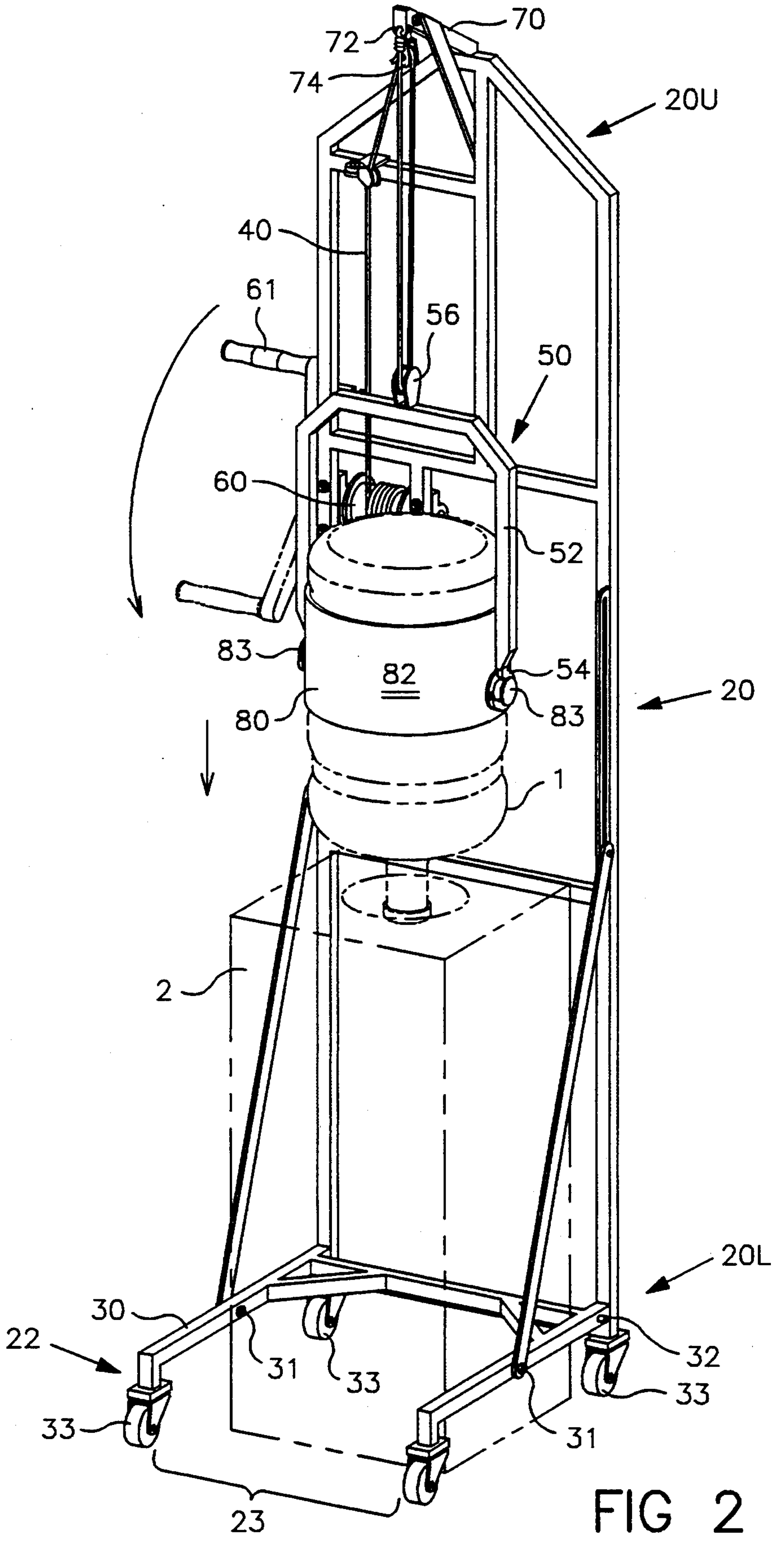
FIG. 2 is a perspective view of the invention of FIG. 1, particularly showing the yoke and bottle raised to a second level, and the bottle inverted so as to be properly positioned in a water cooler, the cooler and bottle not being a part of the invention.

FIGS. 1 and 2 show a water bottle installation apparatus designed to help transport, lift and invert heavy cylindrical water bottles 1 onto a water dispenser 2. Operation of the apparatus requires significantly less strength and dexterity than performing the operation manually. Thus, the apparatus enables the procedure to be efficiently completed by a single person, even those, for instance, having limited strength or back problems.

The basic components of the apparatus are a vertical frame 20, a line cranking means 60, a yoke 50, and a girdle 80.

The largest portion of the apparatus consists of the vertically oriented main structural frame 20. As seen in the FIGURES, preferably the frame 20 is built from sturdy metal bars so as to support the weight of the water bottle 1. It is also preferable to construct the frame 20 of a height great enough to elevate the bottle 1 to the range of heights at which dispensers 2 may be feasibly positioned. A pair of structural support members 30 extend forwardly from a lower end 20L of the frame 20, providing a support base 22 for the apparatus. One elongate member 30 extends from each side edge of the frame 20 so that they are spaced far enough apart to allow the water bottle 1 to be positioned between them. Each elongate member 30 is pivotally hinged to frame 20 at joints 32. A roller means 33, preferably independent wheels, is attached to the support base 22, thereby allowing the apparatus to be easily rolled across a floor surface.

A pair of support arms 25 connect the main frame 20 with the two support members 30 so as to brace the main frame 20 and keep it in its vertical position. An upper end 20U of the main frame 20 has a pulley support arm 70 that extends forward from the frame 20, over a space 23 between the support members 30. The support arm 70 includes a first pulley 74 that faces downward, and an attachment fixture 72 positioned near the end of the support arm 40. Preferably, the attachment fixture 72 is a through hole, although other fixtures could also be implemented.

The line cranking means 60 is engaged on the main frame 20 so that it may be freely rotated. Preferably, the cranking means 60 is located at about waist level, and includes a padded handle 61 so that it may be easily grasped when standing.

The rigid U-shaped yoke 50 includes a second pulley 56 that is positioned on the center of the yoke 50 and extends upwardly. The yoke 50 further has a pair of vertical side arms 52 that are spaced apart so that the bottle of water I fits closely between them. Both of the arms 52 terminate with an attachment means 54. Preferably, the attachment means 54 are circular hooks.

The girdle 80 is of a size for fitting tightly around the water bottle, and includes fasteners 81 to secure the girdle around the bottle. The outer surface 82 of the girdle 80 has engagement means 83. Preferably, the engagement means 83 are horizontal axles extending outwardly from opposing sides of the girdle 80 for rotationally engaging the rotational attachment means 54 of each of the yoke's side arms 52. Engagement means 82 are operationally positioned at the center of mass of the bottle so that little force is required for investing it, the axles 83 rotating freely in the hooks 54.

One end of a flexible line 40 is secured to the line cranking means 60 and is conducted from the cranking means 60 upwardly and through the first pulley 74, then, downwardly and through the second pulley 56, and then upwardly again, where the line 40 is secured to the attachment fixture 72 of the support arm 70.

Thus, as shown in FIG. 1, when the cranking means 60 is rotated in a clockwise direction, the line 40 is drawn from the first pulley 70 and wrapped around the cranking means 60. This elevates the yoke 50 from a first level L1, on or near the ground adjacent the support base 22, to a second level L2, in which the yoke 50 is raised to a desired height nearer the pulley support arm 70. As illustrated in FIG. 2, when the yoke has been raised to the desired height over the water cooler, a crank locking means 63 is actuated in order to lock the cranking means 60 at any selected vertical position of the yoke 50. The bottle is then easily inverted within the yoke 50, secured in the cooler, and detached from the yoke 50 by releasing the girdle 80. The yoke 50 can be lowered from the second level L2 back to the first level L1 by turning the cranking means 60 counter-clockwise.

When the apparatus is not in use, the support base 22 may be folded against the main frame 20 so that the apparatus takes up as little space as possible during storage. To accomplish this, each of the support arms 25 are each pivotally engaged to the elongate structural members 30 by pivot pins 31. The support arms 25 are secured to the main frame 20 through a pair of vertical tracks 27 in the main frame 20, allowing them to slide upwardly in the frame 20 while the structural members 30 are pivotally rotated upwards into parallel vertical alignment with the frame 20.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A water bottle installation apparatus comprising:

a vertically oriented main structural frame having a pair of parallel, spaced apart, horizontally disposed, structural elongate members extending forwardly from a lower end of the main frame providing a support base for the apparatus, a pair of support arms interconnecting the main frame with each of the support members respectively for bracing the main frame in a vertical attitude, and a pulley support arm extending from an upper end of the main frame over a space defined between the elongate members, the support arm including a downwardly disposed first pulley and an attachment fixture integral thereto;

a line cranking means rotationally engaged on the main structural frame;

a rigid U-shaped yoke having a pair of spaced apart vertically disposed side arms each of the arms including rotational attachment means disposed at a terminal end thereof, the yoke further including an upwardly disposed second pulley;

a flexible line engaged at one end thereof to the line cranking means and further conducted therefrom upwardly and through the first pulley, then, downwardly and through the second pulley, and then upwardly again to be terminated at the attachment fixture of the support arm, whereby the cranking means draws the line from the first pulley to elevate the yoke from a first level adjacent the support base, to a second level wherein the first and second pulleys are brought into adjacency, and the reverse process enabled by playing the line from the cranking means whereby with the yoke rotatably attached to the water bottle, the bottle may be raised within the yoke into proximity over a water cooler, the bottle inverted within the yoke and then placed onto the cooler.

2. The apparatus of claim 1 further including a girdle of a size for fitting tightly around the water bottle, the girdle providing engagement means for rotationally engaging the rotational attachment means of each of the side arms of the yoke, and further including clasp means for tightening the girdle around the bottle.

3. The apparatus of claim 2 wherein the arm attachment means are circular hooks and the girdle engagement means are horizontally disposed axles extending outwardly in diametrically opposed positions through a center of mass of the bottle, from the girdle, the axles when engaged within the hooks respectively enable the bottle to be rotated therein for inversion.

4. The apparatus of claim 1 further including roller means attached to the support base for rolling the apparatus on a surface for rolling.

5. The apparatus of claim 1 wherein the cranking means includes crank locking means for locking the cranking means at any selected vertical position of the yoke.

6. The apparatus of claim 1 wherein the elongate members of the support base are positioned for straddling a water cooler so that the main frame is positionable adjacent the water cooler and the yoke is positionable over the water cooler.

7. The apparatus of claim 1 wherein the support arms are each pivotally engaged at a distal end with each respective of the elongate members, the main frame further providing a pair of vertically disposed tracks slidingly engaging a proximal end of each of the support arms respectively, the elongate members being pivotally attached to the main frame, so that the support base may be folded against the main frame for utilizing little space during storage of the apparatus.

* * * * *